United States Patent Office 2,776,320
Patented Jan. 1, 1957

2,776,320

AROMATIC HYDROXY HYDROPEROXIDES

Bernard Hammond Markham Thompson, Beckenham, London, England, assignor, by mesne assignments, to Hercules Powder Company, a corporation of Delaware No Drawing. Application March 17, 1954,
Serial No. 416,964

Claims priority, application Great Britain March 28, 1953

9 Claims. (Cl. 260—610)

The present invention refers to a process for the manufacture of a new group of organic compounds which contain a hydroxy radical and a hydroperoxide radical in the same molecule and relates in particular to a group of compounds wherein said radicals are attached to different carbon atoms.

$\alpha$-Hydroxy-hydroperoxides are known. They have been prepared by the action of hydrogen peroxide upon ketones. These hydroxy hydroperoxides, however, are very unstable compounds which violently explode on heating. This is not surprising in view of the fact that the hydroxy radical and hydroperoxide radical are linked to the same carbon atom.

The present invention refers to a process for the manufacture of hydroxy hydroperoxide compounds in which the hydroxy and hydroperoxy groups are linked to different carbon atoms, said carbon atoms being attached to one or two benzene rings of an aromatic hydrocarbon nucleus in such a manner that they are separated from each other by at least three carbon atoms of the aromatic hydrocarbon nucleus.

The process for the manufacture of hydroxy hydroperoxide compounds according to the invention comprises reacting in the liquid phase at elevated temperatures with molecular oxygen a mono-carbinol of the formula:

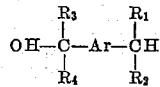

in which $R_1$ may be hydrogen, an alkyl radical or an alicyclic radical and $R_2$, $R_3$ and $R_4$ are alkyl radicals or alicyclic radicals and Ar represents an aromatic hydrocarbon nucleus. Alkyl radicals are, for instance, methyl, ethyl, propyl, isopropyl, butyl, isobutyl, secondary butyl groups and the like and the alicyclic radicals cyclopentyl, cyclohexyl groups and the like. The aromatic hydrocarbon nucleus represented by Ar may be a benzene or alkyl substituted benzene nucleus or may be a naphthalene, anthracene or phenanthrene nucleus, or their alkyl substituted derivatives. The groups

and

are attached to non-adjacent carbon atoms in one or two benzene rings of the aromatic nucleus so that no ortho positions are substituted.

The mono-carbinols from which the hydroxy hydroperoxides are produced according to the process of the present invention may be prepared with advantage from the corresponding mono-hydroperoxides by hydrogenation or other chemical methods of reduction. The hydrogenation may, for instance, be carried out by hydrogen with the aid, as catalyst, of Raney nickel or Adams' catalyst. A further source of mono-carbinols is the mixture in the process for the production of mono-hydroperoxides by the oxidation by means of molecular oxygen of aromatic hydrocarbons of the following formula in which Ar and $R_1$, $R_2$, $R_3$ and $R_4$ have the same significance as defined above:

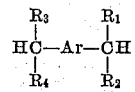

It has now been found that this mixture contains in addition to the hydroperoxides some amounts of the mono-carbinol which may be separated and recovered from said mixture.

The oxidation reaction may be effected with isolated mono-carbinol when this compound is liquid at the reaction temperature. It may also be carried out in the presence of liquids which may be inert to the action of the molecular oxygen and/or the hydroperoxide produced such as water or in the presence of liquid substances which are oxidisable themselves and which dissolve the mono-carbinols. The use of said solvent liquid substances is essential in the case when the carbinol is ordinarily solid at the oxidation temperature. Such solvent substances are, for instance, the initial aromatic hydrocarbons from which the mono-carbinols have been derived.

The temperatures at which the oxidation of the mono-carbinol may be effected may lie within the range 60–130° C., a preferred range is from 90–130° C. which permits a satisfactory yield of the desired product at an economic rate of production. The selection of the temperature most suitable for the process will depend on the respective degrees of importance attached to the rate of reaction on the one hand and to the yield of hydroxy hydroperoxide on the other. The temperature should preferably be so chosen that decomposition of the formed hydroxy hydroperoxide is avoided as much as possible.

The molecular oxygen used for oxidising the mono-carbinols may be in the form of oxygen of high concentration such as commercial oxygen or of gaseous mixtures containing oxygen such as air. Mixtures containing ozone, may in some cases, be used with advantage.

The use of pressures higher than atmospheric may be advantageous, particularly when the oxidation is effected with a gas of low oxygen concentration or when it is desired to obtain a high rate of oxidation.

It is possible to increase the rate of oxidation at any given temperature by adding to the system a heavy metal oxidation catalyst such as compounds of cobalt, manganese, copper, or other catalytically active metal compounds. In this case it is, however, necessary to control carefully the amount of such catalysts in order to avoid excessive decomposition thereby of the hydroxy hydroperoxide formed and consequent reduction in yield. Concentrations of such catalysts in solution in amounts of, for instance, 0.15–0.8% based on the starting material may be used.

The amount of catalyst which may be used varies, however, with the activity of the particular catalyst both in increasing the rate of oxidation and also in promoting the decomposition of the hydroxy hydroperoxide produced. The quantity of catalyst added is, therefore, preferably restricted so that the efficiency of conversion of the mono-carbinol to the hydroxy hydroperoxide is not less than if the same rate of oxidation had been produced by an increase in temperature in the absence of the catalyst. The optimum amount of the specific catalyst used at the reaction temperature chosen can be determined by preliminary experiment. The oxidation may be initiated by the addition of compounds liberating free radicals such as suitable peroxides or hydroperoxides or azo compounds which are known to furnish free radicals at the reaction temperatures.

It is preferable to carry out the oxidation process in the presence of sufficient basic material to prevent accumulation of acids in the reaction mixture. Thus, the oxides, hydroxides, carbonates or bicarbonates of the alkali or alkaline earth metals, or the salts of these metals with weak organic or inorganic acids, may be added either as solids or in the form of solutions, for instance aqueous solutions, to the reaction mixture. Basic nitrogen compounds such as ammonia or certain amines may also be added.

The hydroxy hydroperoxides according to the present invention may be separated from the reaction mixture in a number of ways, for instance by fractional distillation at reduced pressures whereby the unreacted starting materials are removed. Furthermore, they may be recovered from the reaction mixture by extraction by means of water, aqueous alcohol, or aqueous alkali, for instance aqueous sodium hydroxide solution. From the alkaline solution, the free hydroxy hydroperoxides may be recovered by extraction of the alkaline solution by a suitable water-immiscible solvent for the hydroxy hydroperoxides or they may be precipitated by neutralisation or acidification. When the extraction is effected by means of an alkaline solution such as aqueous metal hydroxide solution it is preferred to use a solution in the range from 1-normal to 9-normal, but not in excess of 9-normal (36% w./v. NaOH) as higher concentrations of the alkaline solution tend to precipitate the alkali metal salt contaminated with unreacted monocarbinol which cannot be easily removed. Preferably aqueous alkali metal hydroxide solutions of a strength of 1–2 normal may be used. As an alternative, only a part of the formed hydroxy hydroperoxide may be extracted and the oxidation mixture after the extraction subjected to further oxidation, preferably after addition of fresh monocarbinol.

The oxidation may be carried out batchwise or in a continuous manner.

It is an additional feature of the present invention when working in a continuous manner to start from the aromatic hydrocarbon which is the parent material for the monocarbinol, oxidising this hydrocarbon in the liquid phase by means of molecular oxygen whereby a mixture of the mono-hydroperoxide with some mono-carbinol and some hydroxy hydroperoxide in unreacted aromatic hydrocarbon results. The oxidation reaction is preferably conducted in such a manner that mainly the mono-hydroperoxide and very little di-hydroperoxide is produced. This oxidation mixture is then extracted with aqueous alkali metal hydroxide solution of a strength not greater than about 9-normal and preferably 1 or 2 normal whereby the hydroxy hydroperoxide produced together with any dihydroperoxide also formed are removed in the form of their alkali metal salts which are soluble in the aqueous alkali metal hydroxide solution. From this solution the free hydroxy hydroperoxide is recovered by the addition of acid such as carbon dioxide. The mixture remaining after the removal therefrom of the hydroxy hydroperoxide and comprising unreacted aromatic hydrocarbon parent material, mono-hydroperoxide and mono-carbinol is then passed into a reactor wherein the mixture is subjected to reduction, for instance by the action of sodium sulphite or of hydrogen in the presence of, for example, Raney nickel which reduces the mono-hydroperoxide to mono-carbinol. The solution of mono-carbinol is then recycled to the oxidation stage preferably after the addition of fresh aromatic hydrocarbon parent material.

It will be realised that after the oxidation reaction has been started with the parent aromatic hydrocarbon only, the oxidation step is applied subsequently to a mixture of said aromatic hydrocarbon and mono-carbinol, the latter of which has been recycled.

The hydroxy hydroperoxides prepared by the process according to the present invention have not been described before. They are, in general, soluble in water and form alkali metal salts, such as sodium salts, when treated with dilute aqueous metal hydroxide solutions but these salts are precipitated from such solutions by concentrated aqueous alkali metal hydroxide solutions, for instance more than about 9-normal sodium hydroxide solution. The free hydroxy hydroperoxides are soluble in alcohols such as methanol and ethanol, in ketones such as acetone and methyl isobutyl ketone, in ethers such as di-ethyl ether and di-isopropyl ether and in esters such as ethyl acetate. They are only slightly soluble in cold benzene and toluene and very sparingly soluble in petroleum ether. Their solubility in water offers the special advantage that they may be used with good effect as catalysts in emulsion polymerisation techniques.

By treatment with acidic catalysts, for instance mineral acids, such as sulphuric acid, acid treated mineral earths such as fuller's earth, hydrogen ion exchange material, and Friedel-Crafts catalysts such as aluminum trichloride and boron trifluoride the aryl group with the attached hydroperoxide group is readily converted into the corresponding phenolic group with the simultaneous production of ketones such as acetones or aldehydes such as acetaldehyde and the like. The resulting phenolic compounds contain, in addition to the phenolic hydroxy group, an alcoholic hydroxy group. These two hydroxy groups make the compounds very valuable intermediates for instance in the preparation of plasticisers, of esters for the use of, for instance high boiling solvents and the like.

The process of the invention will be illustrated by the following examples which deal with the production of hydroxy hydroperoxide derived from meta-di-isopropylbenzene, para-di-isopropylbenzene and para-(2-butyl-isopropylbenzene but it should be understood that the invention is not restricted to these derivatives with a benzene nucleus nor wherein the substituting radicals of the said benzene ring are isopropyl groups, but covers the aromatic hydrocarbons defined above. The parts given, if not otherwise stated, refer to parts by weight. Parts by volume bear the same relation to parts by weight as cubic centimetres to grams.

*Example 1*

189 parts of pure meta-isopropyl phenyl dimethyl carbinol prepared by hydrogenating meta-di-isopropyl-benzene mono-hydroperoxide and fractionally distilling the product, were mixed with four parts of calcium hydroxide and 0.5 part of 2-azo-bis-isobutyronitrile as oxidation initiator. The mixture was kept in a thermostatically controlled oil bath at 90° C. Pure oxygen was passed through the mixture. At the start, the oxygen absorption was very slow but later on was maintained at about 400 parts by volume per hour. The rate of oxygen absorption and the rate of peroxide formation began to decrease when the peroxide concentration of the mixture reached 34% by weight. The oxidation was terminated when the peroxide concentration was about 36% by weight when the rate of formation of peroxide was about 0.75% by weight per hour.

The oxidation mixture was allowed to cool and was then diluted with about an equal volume of benzene and filtered free from calcium hydroxide. The benzene solution contained, by analysis about 16.34 parts of meta-(2-hydroxy-2-propyl)-α,α-dimethyl benzyl hydroperoxide in 100 parts by volume of solution. The bulk of the benzene solution was extracted twice with an equal volume of 2-normal aqueous sodium hydroxide solution and the alkali solution thus obtained was washed after each extraction with a little benzene. The combined aqueous alkali extract was the neutralised with carbon dioxide. A white crystalline solid was precipitated which after filtering and drying had a melting point of 71° to 72° C. It was purified and freed from co-precipitated sodium bicarbonate by dissolving it in benzene, filtering and precipitating with petroleum ether. Thus purified, the meta-(2-hydroxy-2-propyl)-α,α-dimethyl-benzyl hydroperoxide had a melting point 71.5 to 72° C. and was 99.3% pure by iodometric titration.

Only 80% of the hydroxy hydroperoxide was extracted in this way from the oxidation mixture by means of 2-normal aqueous sodium hydroxide solution. The remainder was precipitated as sodium salt by shaking with a 50% sodium hydroxide solution. After being filtered, washed thoroughly with benzene and dried, the sodium salt was suspended in water and acidified with solid carbon dioxide as described. In this manner, a further five parts of the hydroxy hydroperoxide were obtained, bringing the total of the meta-hydroxy hydroperoxide isolated from the oxidation to 58 parts. The efficiency of production of the hydroxy hydroperoxide based on oxygen absorbed was 72.2%.

Example 2

500 parts of para-isopropyl phenyl dimethyl carbinol were stirred vigorously with 20 parts of calcium hydroxide and 0.5 part of bis-2-azo-butyronitrile and oxidised at 90° C. in a stream of oxygen. The hydroperoxide formation amounted to 0.9% by weight of hydroperoxide per hour at 70% efficiency calculated on oxygen absorbed. When the hydroperoxide concentration reached 34% by weight in the reaction mixture the rate of hydroperoxide formation started to decrease.

The oxidation mixture was allowed to cool slightly and then diluted with 500 parts by volume of benzene and filtered free from calcium hydroxide. The filtrate on cooling solidified to a large extent. The solid was filtered off under suction, and the filtrate diluted with petroleum ether which caused the precipitation of further solid material. This was filtered, combined with the first batch of solid, and then washed with petroleum ether. In this manner a total of 170 parts of a white crystalline solid, melting point 83–85° C. and containing by iodometric analysis 87% w./w. of hydroxy hydroperoxide, was obtained. This accounted for 68% of the hydroperoxide formed in the oxidation. The filtrate solution was freed from solvent; it then contained about 12% by weight of hydroxy hydroperoxide and was returned to be reoxidised.

The crude para-(2-hydroxy-2-propyl) - α,α - dimethyl benzyl hydroperoxide was dissolved in a mixture of benzene and petroleum ether and the recrystallised product had a melting point 91.5–92.5° C. and was 98% pure.

Example 3

48 parts of highly purified p-isopropyl phenyl ethyl methyl-carbinol which had been prepared by Grignard reaction from p-bromo-isopropylbenzene and ethyl methyl ketone and which had a melting point 24° C. and boiling point 72–73° C./0.2 mm. Hg was suspended in 12.5 parts of an aqueous solution containing 0.25 part of sodium carbonate, to which 0.2 part of azo-bis-iso-butyronitrile was added as initiator. The mixture was heated at 90° C. and oxygen passed through with vigorous agitation. After 90 hours during which the oxygen absorption took place at a fairly steady rate the reaction mixture contained 46% peroxide.

The oxidation mixture consisting of an oil phase and an aqueous phase after having been cooled was extracted with 10 portions of 20 parts by volume each of benzene. The benzene extracts were then combined and extracted with 10 portions of 50 parts by volume each of an aqueous 30% sodium hydroxide solution. These alkaline extracts were combined and washed with benzene to remove non-peroxidic organic material and the free hydroxy hydroperoxide liberated from its sodium salt by means of carbon dioxide. The hydroxy hydroperoxide was then extracted into benzene, the benzene solution dried over anhydrous sodium sulphate, evaporated under reduced pressure at approximately 20–30° C., the residue finally stripped under 0.5 mm. pressure.

15.2 parts of the m-(2-hydroxy-butyl)-α,α-dimethylbenzyl hydroperoxide were recovered as a very viscous liquid with $n_D^{20}$ 1.5292 and a peroxide content of 83% (calculated as the desired hydroxy hydroperoxide).

The benzene solution from which the above quantity of the hydroxy hydroperoxide had been extracted by the aqueous sodium hydroxide still contained considerable amounts of the hydroxy hydroperoxide. In order to recover these the benzene was stripped and yielded 17 parts of a similar viscous material of a less pure nature, as shown by the refractive index $n_D^{20}$ 1.5282, and having a hydroxy hydroperoxide content of 71%.

I claim:

1. As a new composition of matter a hydroxy hydroperoxide of the formula

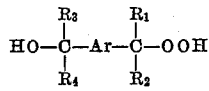

in which —R₁ is selected from the group consisting of hydrogen, alkyl and cycloalkyl, and —R₂, —R₃ and —R₄ are selected from the group consisting of alkyl and cycloalkyl, and Ar is a divalent aromatic nucleus in which the substituents,

and

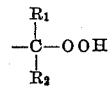

are attached to nonadjacent carbon atoms of the aromatic nucleus.

2. As a new product para-(2-hydroxy-2-propyl)-α,α-dimethylbenzyl hydroperoxide.

3. As a new product, meta-(2-hydroxy-2-propyl)-α,α-dimethylbenzyl hydroperoxide.

4. A process for the manufacture of a hydroxy hydroperoxy compound of the formula

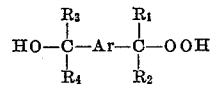

in which —R₁ is selected from the group consisting of hydrogen, alkyl and cycloalkyl and —R₂, —R₃ and —R₄ are selected from the group consisting of alkyl and cycloalkyl and —Ar— is a divalent aromatic nucleus in which the substituents

and

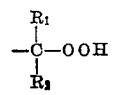

attached to nonadjacent carbon atoms, which comprises reacting a monocarbinol of the formula

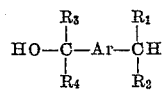

in the liquid phase at elevated temperatures in the range of 60–130° C. with molecular oxygen.

5. The process of claim 4 in which the reaction temperature is in the range of 90–130° C.

6. The process of claim 4 in which a catalytic amount of a free radical forming catalyst is present in the reaction mixture.

7. The process of claim 4 in which an acid neutralizing basic substance is contacted with the reaction mixture during the course of the oxidation.

8. The process of claim 4 in which the hydroxy hydroperoxy compound is separated from the oxidate and the monocarbinol is recycled to the oxidation step.

9. As a new product m-(2-hydroxybutyl)-$\alpha,\alpha$-dimethylbenzyl hydroperoxide.

References Cited in the file of this patent
UNITED STATES PATENTS

| | | |
|---|---|---|
| 2,548,435 | Lorand et al. | Apr. 10, 1951 |
| 2,671,809 | Fortuin et al. | Mar. 9, 1954 |
| 2,683,751 | Filar | July 13, 1954 |
| 2,715,646 | Hawkins et al. | Aug. 16, 1955 |
| 2,724,729 | Lorand | Nov. 22, 1955 |